(12) United States Patent
Lee et al.

(10) Patent No.: US 12,062,241 B2
(45) Date of Patent: Aug. 13, 2024

(54) LANE RECOGNITION DEVICE AND METHOD BASED ON LIDAR FOR VEHICLE

(71) Applicants: HYUNDAI MOTOR COMPANY, Seoul (KR); Kia Corporation, Seoul (KR)

(72) Inventors: Nam Hyung Lee, Seoul (KR); Sung Moon Jang, Seongnam-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 395 days.

(21) Appl. No.: 17/517,552

(22) Filed: Nov. 2, 2021

(65) Prior Publication Data

US 2022/0366174 A1 Nov. 17, 2022

(30) Foreign Application Priority Data

May 12, 2021 (KR) .................. 10-2021-0061568

(51) Int. Cl.
  *G06V 20/56* (2022.01)
  *G01S 17/894* (2020.01)
  *G01S 17/931* (2020.01)
  *G06V 10/44* (2022.01)

(52) U.S. Cl.
  CPC .......... *G06V 20/588* (2022.01); *G01S 17/894* (2020.01); *G01S 17/931* (2020.01); *G06V 10/44* (2022.01)

(58) Field of Classification Search
  CPC . G06T 2207/20076; G06T 2207/20081; G06T 2207/20084; G06F 18/2431; G06F 18/254; G06F 18/285; G06F 18/214; G06N 3/08; G06V 20/588; G06V 10/82; G06V 20/58; G06V 20/56; G06V 10/44
  See application file for complete search history.

(56) References Cited

U.S. PATENT DOCUMENTS

| | | | |
|---|---|---|---|
| 9,530,062 B2 | 12/2016 | Nguyen et al. | |
| 11,092,690 B1* | 8/2021 | Meier | ............ G01S 17/89 |
| 2019/0266418 A1* | 8/2019 | Xu | ............ G06V 10/764 |
| 2021/0063200 A1* | 3/2021 | Kroepfl | ............ C03C 17/3644 |
| 2022/0189054 A1* | 6/2022 | Kaiser | ............ G06V 20/582 |

FOREIGN PATENT DOCUMENTS

| | | |
|---|---|---|
| EP | 1 557 691 B1 | 5/2009 |
| WO | 2018-101526 A1 | 6/2018 |

OTHER PUBLICATIONS

Charles R. Qi, et al., "PointNet++: Deep Hierarchical Feature Learning on Point Sets in a Metric Space", arXiv:1706.02413, Jun. 7, 2017, pp. 1-14.

* cited by examiner

*Primary Examiner* — Margaret G Mastrodonato
(74) *Attorney, Agent, or Firm* — MORGAN, LEWIS & BOCKIUS LLP

(57) ABSTRACT

A lane recognition device based on a Light Detection and Ranging (LiDAR) for a vehicle and a method thereof may include a pre-processor that detects a lane point candidate group based on information detected from the LiDAR, a deep learning device that generates lane recognition information by learning the lane point candidate group, and a post-processor that converts the lane recognition information into lane information by use of a lane curve fitting algorithm.

16 Claims, 7 Drawing Sheets

LANE RECOGNITION DEVICE AND METHOD BASED ON LIDAR FOR VEHICLE

CROSS-REFERENCE TO RELATED APPLICATION

The present application claims priority to Korean Patent Application No. 10-2021-0061568, filed on May 12, 2021, the entire contents of which is incorporated herein for all purposes by this reference.

BACKGROUND OF THE INVENTION

Field of the Invention

The present invention relates to a lane recognition device based on a Light Detection and Ranging (LiDAR) for a vehicle and a method thereof.

Description of Related Art

Lane recognition results are usefully used in an advanced driver assistance system (ADAS) or an autonomous driving system.

Lane recognition technologies are used to warn a driver not to deviate from a lane or guide a vehicle into a driving lane through steering assistance.

In general, lane recognition may be implemented by acquiring an image around a vehicle using a camera and analyzing the acquired image.

However, the lane recognition using a camera has a problem in that the lane recognition rate is lowered in an environment such as a situation in which the surrounding illuminance is excessively high, a situation in which the surrounding illuminance is excessively low, and backlight.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a lane recognition device based on a Light Detection and Ranging (LiDAR) for a vehicle and a method capable of recognizing a lane irrespective of an environment around a vehicle, in particular, changes in illuminance.

The technical problems to be solved by the present invention are not limited to the aforementioned problems, and any other technical problems not mentioned herein will be clearly understood from the following description by those skilled in the art to which various exemplary embodiments of the present invention pertains.

According to various aspects of the present invention, a lane recognition device based on a LiDAR for a vehicle includes a pre-processor that detects a lane point candidate group based on information detected from the LiDAR, a deep learning device that generates lane recognition information by learning the lane point candidate group, and a post-processor that converts the lane recognition information into lane information by use of a lane curve fitting algorithm.

In various exemplary embodiments of the present invention, the LiDAR may provide point cloud type information to the pre-processor.

In various exemplary embodiments of the present invention, the pre-processor may extract points which may be recognized as lanes and may provide the extracted points to the deep learning device, based on intensity information of each of points included in the point cloud type information.

In various exemplary embodiments of the present invention, the intensity information of each of the points may be information having a lower value as a surface color of an object on which a point is detected is closer to black, and having a higher value as the surface color of the object on which the point is detected is closer to white.

In various exemplary embodiments of the present invention, the pre-processor may extract only points in which a ratio of an intensity of a current point to an intensity of a previous point exceeds a preset range as points which may be recognized as the lanes, based on the intensity information of each of the points included in the point cloud type information.

In various exemplary embodiments of the present invention, the pre-processor may perform down-sampling to provide the lane point candidate group with a decreased number of points to the deep learning device, when the number of points included in the lane point candidate group is counted and is greater than or equal to a preset number, and may perform up-sampling to provide the lane point candidate group with an increased number of points to the deep learning device, when the number of points included in the lane point candidate group is less than the preset number.

In various exemplary embodiments of the present invention, the pre-processor may perform the down-sampling or the up-sampling to provide the lane point candidate group of a predetermined number of points to the deep learning device.

In various exemplary embodiments of the present invention, the pre-processor may include an extractor that extracts only points which may be recognized as lanes in the point cloud type information, and a point input device that up-samples or down-samples the number of points provided from the extractor to generate the lane point candidate group having a predetermined number of points.

In various exemplary embodiments of the present invention, the deep learning device may select some points from among points included in the lane point candidate group, may extract points within a plurality of preset distances from each center of the selected some points, and may perform multilayer perceptron-based deep learning by inputting the extracted points therein.

In various exemplary embodiments of the present invention, the plurality of preset distances may include a first preset distance, a second preset distance, and a third preset distance, and the deep learning device may extract points within the first preset distance from each center of the some points, and may perform the multilayer perceptron-based deep learning by inputting the points extracted within the first preset distance, may extract points within the second preset distance from each center of the some points, and may perform the multilayer perceptron-based deep learning by inputting the points extracted within the second preset distance, and may extract points within the third preset distance from each center of the some points, and may perform the multilayer perceptron-based deep learning by inputting the points extracted within the third preset distance.

In various exemplary embodiments of the present invention, the deep learning device may include a first range sampler that extracts points within the first preset distance from each center of the some points, a first learner that performs the multilayer perceptron-based deep learning by inputting the points extracted from the first range sampler, a second range sampler that extracts the points within the second preset distance from each center of the some points, a second learner that performs the multilayer perceptron-based deep learning by inputting the points extracted from the second range sampler, a third range sampler that extracts the points within the third preset distance from each center of the some points, and a third learner that performs the multilayer perceptron-based deep learning by inputting the points extracted from the third range sampler.

In various exemplary embodiments of the present invention, the deep learning device may further include a learning result integrator that integrates learning information provided from the first leaner, the second learner and the third learner, and a decoder that decodes a result of the learning result integrator to generate the lane recognition information.

In various exemplary embodiments of the present invention, the lane recognition information may include a probability that each point included in the lane point candidate group is a noise point, a probability that each point included in the lane point candidate group is a left lane point, and a probability that each point included in the lane point candidate group is a right lane point.

According to various aspects of the present invention, a lane recognition method based on a LiDAR for a vehicle includes a receiving operation of receiving a lane point candidate group from the LiDAR, an extraction operation of extracting points in which an intensity ratio of a current point to an intensity of a previous point exceeds a preset range based on intensity information of points included in the lane point candidate group, a point input operation of sampling the number of points extracted in the extraction operation to a specific number, a first range sampling operation of selecting some points among points sampled in the point input operation and extracting points within a first distance from each center of the selected points, a second range sampling operation of extracting points within a second distance from each center of the some points selected in the point input operation, a third range sampling operation of extracting points within a third distance from each center of the some points selected in the point input operation, a first learning operation of learning the points extracted in the first range sampling operation, a second learning operation of learning the points extracted in the second range sampling operation, a third learning operation of learning the points extracted in the third range sampling operation, a learning result integration operation of integrating results learned in the first learning operation, the second learning operation and the third learning operation, a decoding operation of decoding the learning results integrated in the learning result integration operation, and a post-processing operation of generating lane information through a fitting algorithm based on results of the decoding operation.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
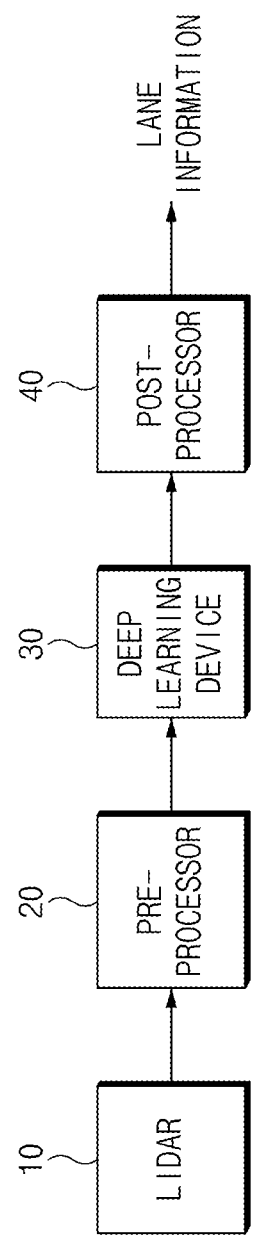
FIG. 1 is a diagram illustrating a configuration of a lane recognition device based on a Light Detection and Ranging (LiDAR) for a vehicle according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of the related known configuration or function will be omitted when it is determined that it interferes with the understanding of the exemplary embodiment of the present invention.

In describing the components of the exemplary embodiment according to various exemplary embodiments of the present invention, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

Hereinafter, embodiments of the present invention will be described in detail with reference to FIGS. 1 to 6.

FIG. 1 is a diagram illustrating a configuration of a lane recognition device based on a LiDAR for a vehicle according to various exemplary embodiments of the present invention.

Referring to FIG. 1, a lane recognition device based on a LiDAR for a vehicle according to various exemplary embodiments of the present invention may be implemented inside a vehicle. In the instant case, the lane recognition device based on the LiDAR may be integrally formed with vehicle's internal control units or may be implemented as a separate device and connected to the vehicle's control units by a separate connection means.

In detail, the lane recognition device based on the LiDAR according to various exemplary embodiments of the present invention is connected to an ADAS and an autonomous driving system to provide precise lane information, warning a driver not to deviate from the lane or guiding the vehicle into the driving lane.

Referring to FIG. 1, the lane recognition device based on the LiDAR according to various exemplary embodiments of the present invention includes a LiDAR 10, a pre-processor 20, a deep learning device 30, and a post-processor 40.

The LiDAR 10 may emit a laser pulse and may receive a laser pulse which is reflected by an object and returned. In the instant case, the LiDAR 10 may detect points based on the laser pulse which is reflected by the object and returned, and each point may have intensity information of the returned laser pulse.

The information detected from the LiDAR 10 may be provided to the pre-processor 20 as point cloud type information.

The pre-processor 20 may detect a lane point candidate group, based on the point cloud type information provided from the LiDAR 10.

For example, the pre-processor 20 may extract a point which may be recognized as a lane in the point cloud type information, based on the intensity information of each point included in the point cloud type information.

Furthermore, the pre-processor 20 may convert the information of the extracted lane point candidate group to fit an input format of the deep learning device 30.

The deep learning device 30 may generate lane recognition information by learning the information of the lane point candidate group provided from the pre-processor 20. In the instant case, the lane recognition information may include information for distinguishing a left lane, a right lane, and a noise point of a vehicle.

In the instant case, the deep learning device 30 may be implemented with a multilayer perceptron-based deep learning network.

The post-processor 40 may convert the lane recognition information provided from the deep learning device 30 into lane information through lane curve fitting algorithm. In the instant case, the post-processor 40 may output lane information obtained by converting the lane recognition information into a data format used by electronic devices inside the vehicle.

The pre-processor will be described with reference to FIG. 2, FIG. 3 and FIG. 4 as follows.

Figure 2:
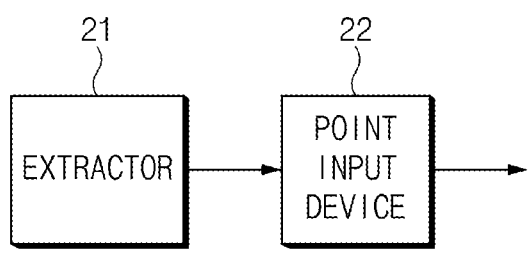
FIG. 2 is a diagram illustrating a configuration of a pre-processor included in a lane recognition device based on a LiDAR for a vehicle according to various exemplary embodiments of the present invention.

Referring to FIG. 2, the pre-processor 20 may include an extractor 21 and a point input device 22.

The extractor 21 may extract the lane point candidate group based on the intensity information of each point included in the point cloud type information provided from the LiDAR 10.

In the instant case, the intensity information of the point is determined by a surface color of an object in which the point is detected, and the point intensity may have a lower value as the surface color of the object is closer to black and may have a higher value as the surface color of the object is closer to white.

The extractor 21 may extract only points in which a ratio of the intensity of a current point to the intensity of a previous point exceeds a preset range among the points of the point cloud type information to generate the lane point candidate group. In detail, the extractor 21 may extract only points in which a point intensity change rate exceeds a preset change range among the points of the point cloud type information to generate the lane point candidate group.

For example, the extractor 21 may extract points in which the point intensity change rate exceeds a maximum value of the preset change range among points of the point cloud type information to generate the lane point candidate group.

Also, the extractor 21 may extract points in which the point intensity change rate is less than a minimum value of the preset change range among points of the point cloud type information to generate the lane point candidate group.

Figure 3:
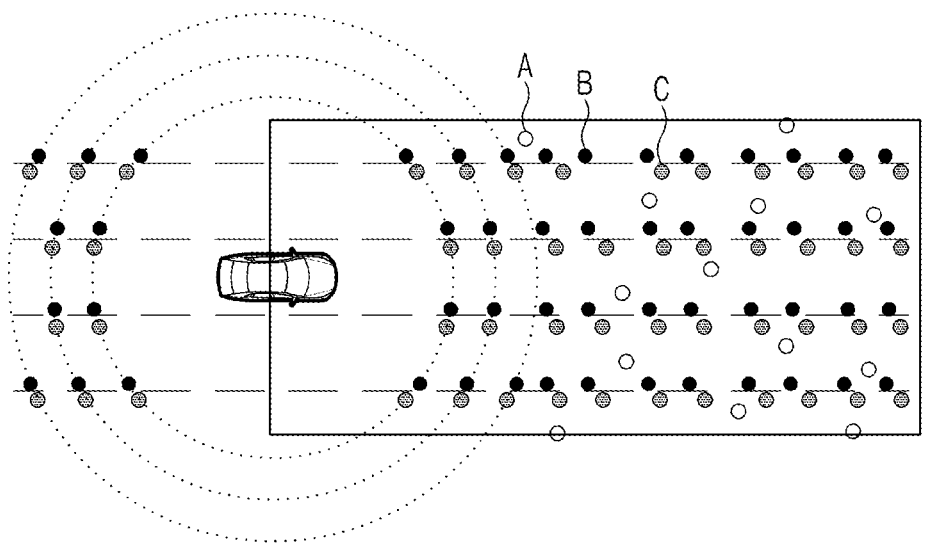
FIG. 3, FIG. 4, and FIG. 5 are diagrams for describing an operation of a pre-processor included in a lane recognition device based on a LiDAR for a vehicle according to various exemplary embodiments of the present invention.

Referring to FIG. 3, point A of FIG. 3 may be a point in which the point intensity change rate is within a preset change range, point B may be a point in which the point intensity change rate is less than a minimum value of the preset change range, and point C may be a point in which the point intensity change rate exceeds a maximum value of the preset change range. As described above, the extractor 21 may extract only the point B and the point C among the points A, B, and C illustrated in FIG. 3 to generate the lane point candidate group.

The point input device 22 may convert the number of points of the lane point candidate group provided from the extractor 21 into a preset number and provide it to the deep learning device 30.

The deep learning device 30 should be provided with data of a preset capacity. However, the number of points detected from the LiDAR 10 is not uniform, and the number of points of the lane candidate group generated by the extractor 21 is also not uniform.

Therefore, the point input device 22 is connected between the extractor 21 and the deep learning device 30, may convert the number of points of the lane point candidate group provided from the extractor 21 into the number of points required by the deep learning device 30, and may provide it to the deep learning device 30.

Figure 5:
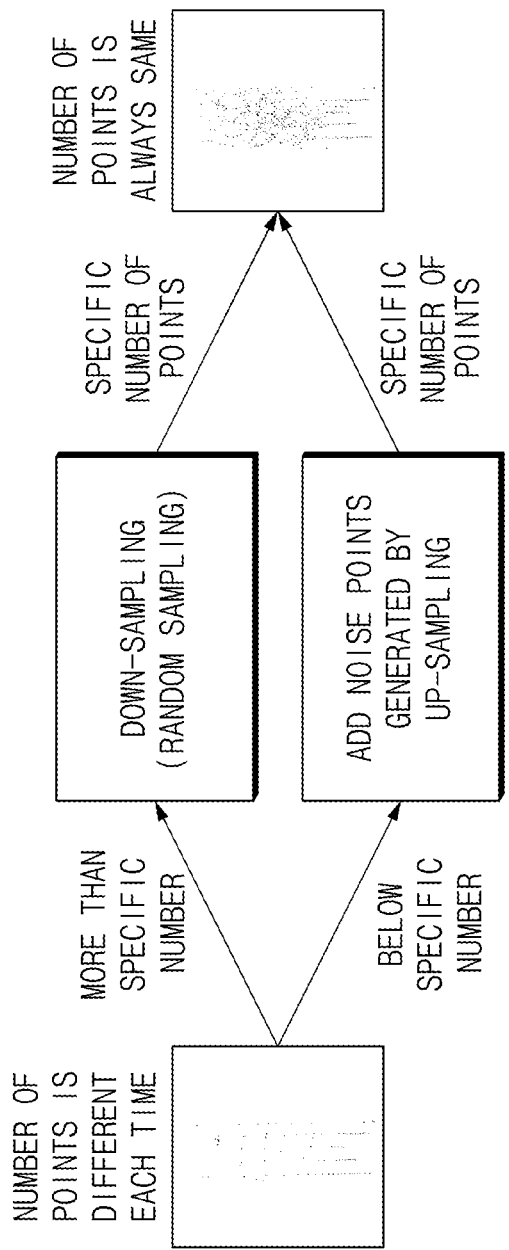

Referring to FIG. 5, the point input device 22 may count the number of points of the lane point candidate group provided from the extractor 21.

When the number of points of the counted lane point candidate group is greater than or equal to a preset number (a specific number), the point input device 22 may decrease the number of points of the lane point candidate group by performing down-sampling and then may provide it to the deep learning device 30.

Meanwhile, when the number of points of the counted lane point candidate group is less than or equal to the preset number (a specific number), the point input device 22 increases the number of points of the lane point candidate group by performing up-sampling and then may provide it to the deep learning device 30.

Figure 6:
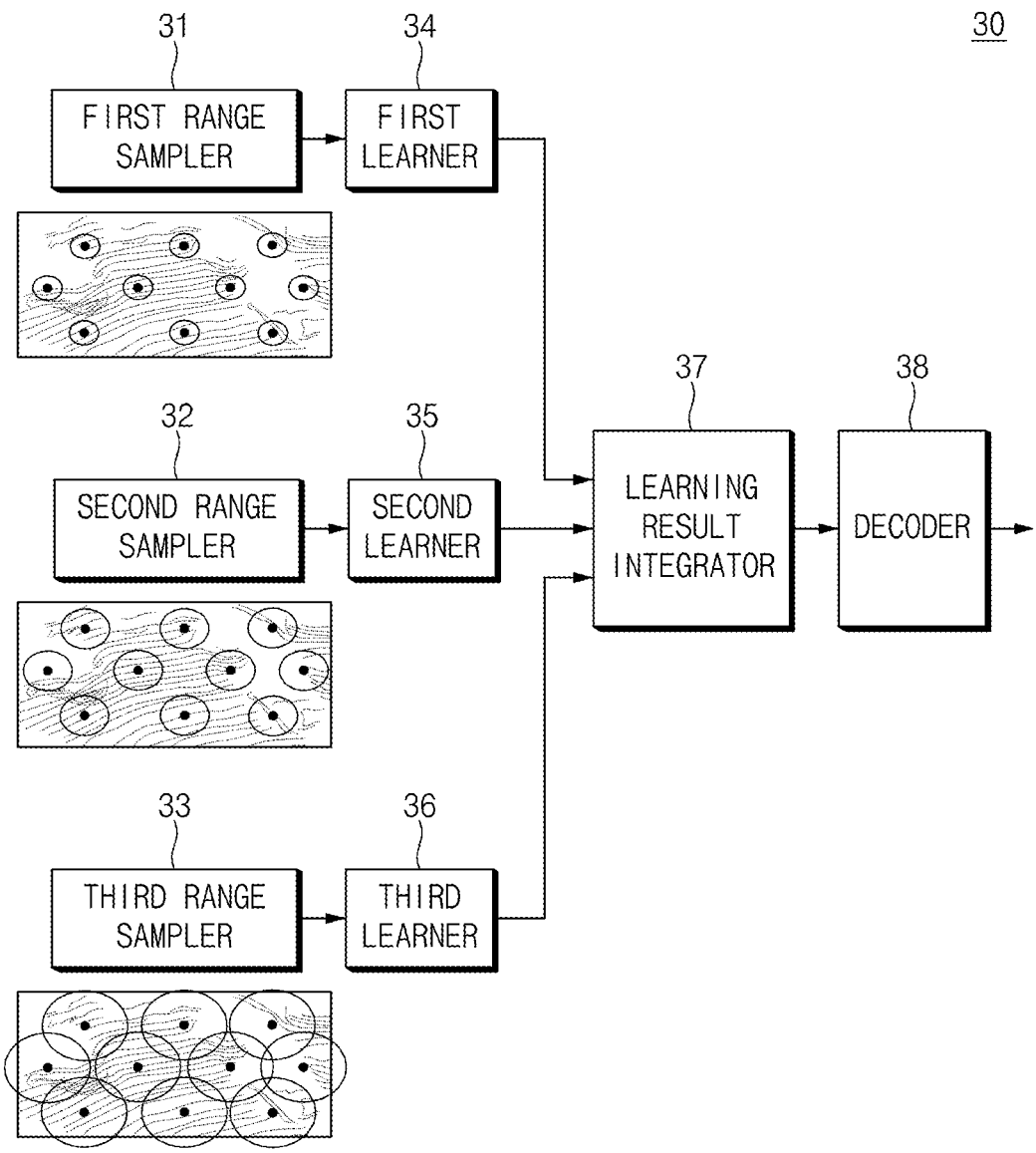
FIG. 6 is a diagram illustrating a configuration of a deep learning device included in a lane recognition device based on a LiDAR for a vehicle according to various exemplary embodiments of the present invention.
Figure 7:
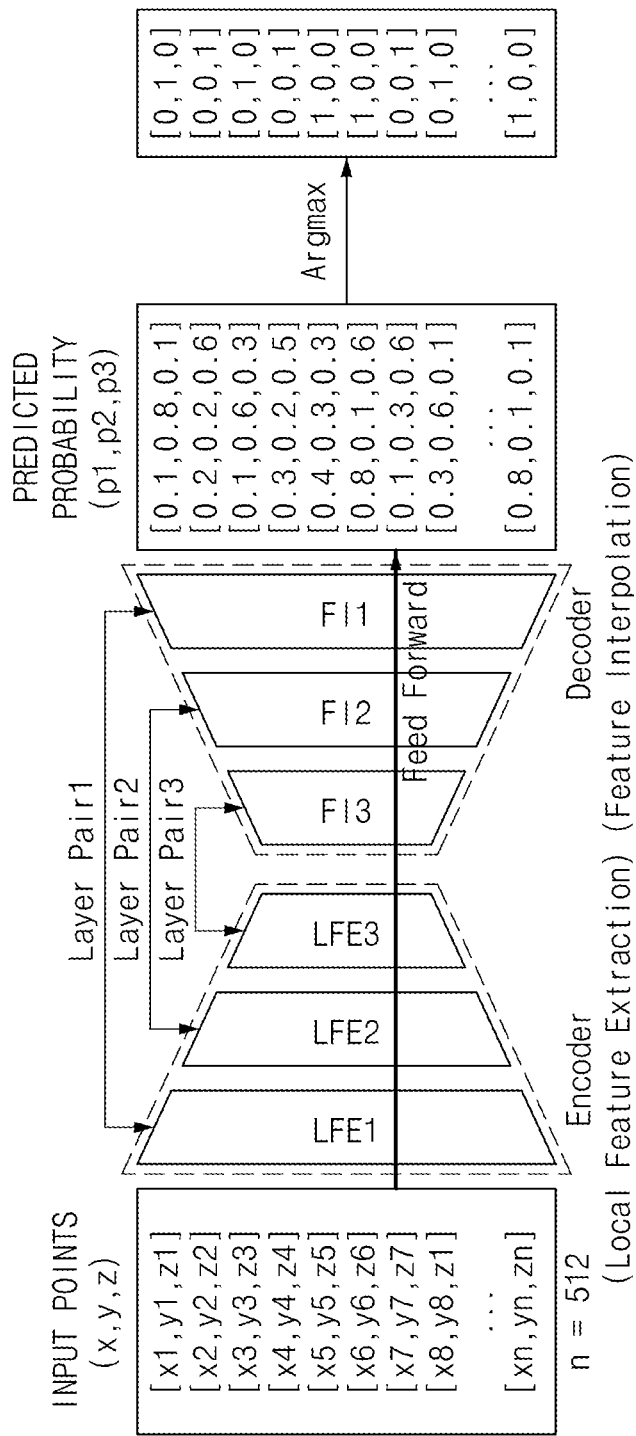
FIG. 7 is a diagram for describing an operation of a deep learning device included in a lane recognition device based on a LiDAR for a vehicle according to various exemplary embodiments of the present invention.

Referring to FIG. 6 and FIG. 7, the deep learning device 30 will be referred to as follows.

As illustrated in FIG. 6, the deep learning device 30 may include a first range sampler 31, a second range sampler 32, a third range sampler 33, a first learner 34, a second learner 35, a third learner 36, a learning result integrator 37, and a decoder 38.

The deep learning device 30 may convert the lane point candidate group provided from the pre-processor 20 into data in a form suitable for multilayer perceptron-based deep learning, and then may provide the converted data to the first to third range samplers 31, 32, and 33.

For example, the deep learning device 30 may label the information of the lane point candidate group provided from the pre-processor 20 by use of a labeling tool and may provide the labeled information to the first to third range samplers 31, 32, and 33.

In more detail, a left lane point of the lane point candidate group may be labeled with 1, a right lane point of the lane point candidate group may be labeled with 2, and a non-lane point of the lane point candidate group may be labeled with 0, and lane points may be converted into a form of one hot vector ('0'[1,0,0], '1'[0,1,0], and '2'[0,0,1]).

The first range sampler 31 may select some of the information of the lane point candidate group provided from the pre-processor 20 by use of farthest point sampling (FPS) algorithm, and may extract points that exist within a first preset distance from the selected point.

The second range sampler 32 may select some of the information of the lane point candidate group provided from the pre-processor 20 by use of the farthest point sampling (FPS) algorithm and may extract points that exist within a second preset distance from the selected point.

The third range sampler 33 may select some of the information of the lane point candidate group provided from the pre-processor 20 by use of the farthest point sampling (FPS) algorithm and may extract points that exist within a third preset distance from the selected point.

In the instant case, the first preset distance among the first to third preset distances may be the shortest distance, and the third preset distance may be the longest distance.

The first learner 34 may perform a multilayer perceptron (MLP)-based deep learning by inputting the points extracted from the first range sampler 31.

The second learner 35 may perform the multilayer perceptron (MLP)-based deep learning by inputting the points extracted from the second range sampler 32.

The third learner 36 may perform the multilayer perceptron (MLP)-based deep learning by inputting the points extracted from the third range sampler 33.

The reason why a lane recognition device based on a LiDAR for a vehicle and a method thereof according to various exemplary embodiments of the present invention sample input information into different ranges and perform deep learning with respect to each sampling result is as follows.

Figure 4:
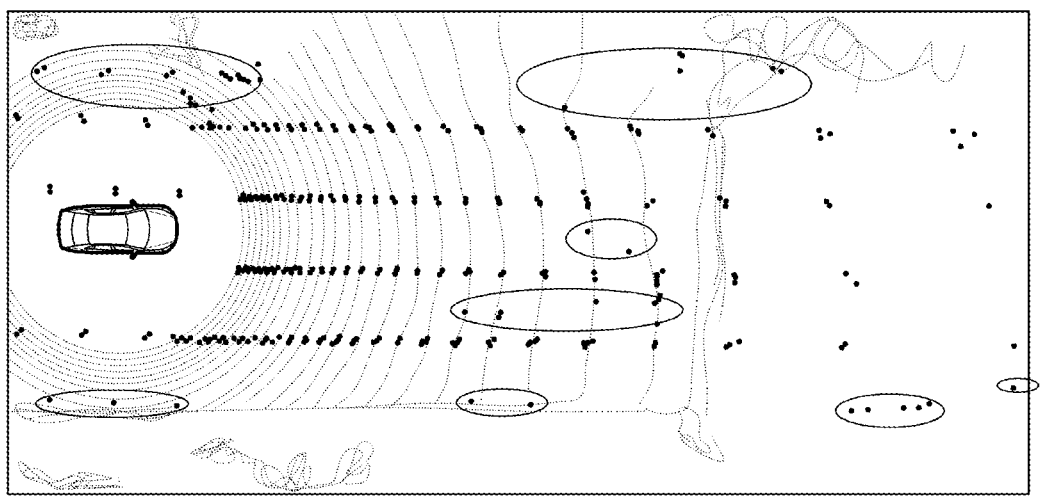

As illustrated in FIG. 4, the detection result of the LiDAR 10 may be represented as each point, and a density of points detected at a close distance to the LiDAR 10 is greater than the density of points detected at a far distance to the LiDAR 10.

To increase the accuracy of lane recognition for points detected from the LiDAR 10, the lane recognition device based on a LiDAR for a vehicle and a method thereof according to various exemplary embodiments of the present invention may sample points within different radiuses (first to third ranges) from some points among the points detected from the LiDAR 10, and may learn the sampled points.

In detail, the lane recognition device based on a LiDAR for a vehicle and a method thereof according to various exemplary embodiments of the present invention may learn by sampling the points within the smallest radius when points that are close to the LiDAR 10, that is, with high density are sampled, and may learn by sampling the points within the largest radius when points that are far away from the LiDAR 10, that is, with low density are sampled. Accordingly, both the lane recognition accuracy for points at a close distance and the lane recognition accuracy for points at a far distance may be improved.

As illustrated in FIG. 6, in the lane recognition device based on a LiDAR for a vehicle and a method thereof, sampling by dividing a short distance into a first range, a medium distance into a second range, and a long distance into a third range is disclosed.

The learning result integrator 37 may integrate the learning result (concatenated feature) provided from the first leaner, the second learner and the third learner 34, 35, and 36.

The decoder 38 may decode the integrated learning result (concatenated feature) provided from the learning result integrator 37.

In detail, the learning result integrator 37 may integrate high-dimensional learning information provided from each of the first leaner, the second learner and the third learner 34, 35, and 36, and then may provide the integrated learning information (concatenated feature) to the decoder 38. The decoder 38 may convert the integrated high-dimensional information back into 3D information by use of an interpolation method.

Referring to FIG. 7, as the multilayer perceptron-based deep learning is performed using the information (input point) of the lane point candidate group provided from the pre-processor 20 as an input, and as the deep learning results are integrated and the interpolation is performed, a probability that each point included in the lane point candidate group is a noise point, a probability that each point included in the lane point candidate group is a left lane point, and a probability that each point included in the lane point candidate group is a right lane point may be generated as a result.

In the instant case, learning the information of the lane point candidate group (multilayer perceptron-based deep learning) and integrating the learning results may correspond to a role of an encoder that performs a local feature extraction, and performing a feature interpolation with respect to the integrated learning result may correspond to the role of the decoder.

For example, when the multilayer perceptron-based deep learning is performed with respect to an [x, y, z] value of each point included in the lane point candidate group, a probability value of each point may be predicted (probability that each point is a noise point, probability that each point is a left lane point, and probability that each point is a right lane point).

When the probability value of the point predicted by the deep learning device 30 is [0.1, 0.8, 0.1], the highest probability value is converted to '1', and the remaining probability values are converted to '0', and then information of [0, 1, 0] may be provided to the post-processor 40.

The post-processor 40 may convert information of each point (whether it is a noise point, whether it is a left lane point, and whether it is a right lane point) provided from the deep learning device 30 into lane information through the fitting algorithm.

For example, a point of [1, 0, 0] may refer to a noise point, a point of [0, 1, 0] may refer to a left lane point, and a point of [0, 0, 1] may refer to a right lane point.

As described above, the lane recognition device based on a LiDAR for a vehicle and a method thereof according to various exemplary embodiments of the present invention may extract points which may be recognized as lanes among the points detected from the LiDAR to generate the lane point candidate group.

The lane recognition device based on a LiDAR for a vehicle and a method thereof according to various exemplary embodiments of the present invention may predict whether each of the points included in the lane point candidate group is a noise point, a left lane point, or a right lane point, by performing the multilayer perceptron-based deep learning using the lane point candidate group as an input.

Thereafter, the lane recognition device based on a LiDAR for a vehicle and a method thereof according to various exemplary embodiments of the present invention may generate the lane information, based on the result of the multilayer perceptron-based deep learning (the result of predicting whether each point is a noise point, a left lane point, or a right lane point.).

As a result, the lane recognition device based on a LiDAR for a vehicle and a method thereof according to various exemplary embodiments of the present invention may more accurately generate lane information by better recognizing lanes even in the environment change around the vehicle, even with a sudden change in illuminance, compared to the existing technology that generates lane information using a camera.

According to various exemplary embodiments of the present invention, the lane recognition rate may not decrease even with sudden changes in illuminance.

Furthermore, various effects directly or indirectly identified through the present specification may be provided.

The above description is merely illustrative of the technical idea of the present invention, and those of ordinary skill in the art to which various exemplary embodiments of the present invention pertains will be able to make various modifications and variations without departing from the essential characteristics of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A lane recognition device based on a Light Detection and Ranging (LiDAR) for a vehicle, the lane recognition device comprising:
    a pre-processor configured to detect a lane point candidate group based on information detected from the LiDAR;
    a deep learning device configured to generate lane recognition information by learning the lane point candidate group; and
    a post-processor configured to convert the lane recognition information into lane information by use of a lane curve fitting algorithm,
    wherein the deep learning device is configured to select a predetermined number of points from among points included in the lane point candidate group, to extract points within a plurality of preset distances from each center of the selected number of points, and to perform multilayer perceptron-based deep learning by inputting the extracted points therein,
    wherein the plurality of preset distances include a first preset distance, a second preset distance, and a third preset distance, and
    wherein the deep learning device is configured:
        to extract points within the first preset distance from each center of the selected number of points, and to perform the multilayer perceptron-based deep learning by inputting the points extracted within the first preset distance;
        to extract points within the second preset distance from each center of the selected number of points, and to perform the multilayer perceptron-based deep learning by inputting the points extracted within the second preset distance; and
        to extract points within the third preset distance from each center of the selected number of points, and to perform the multilayer perceptron-based deep learning by inputting the points extracted within the third preset distance,
    wherein the deep learning device includes:
        a first range sampler configured to extract points within the first preset distance from each center of the selected number of points;
        a first learner configured to perform the multilayer perceptron-based deep learning by inputting the points extracted from the first range sampler;
        a second range sampler configured to extract the points within the second preset distance from each center of the selected number of points;
        a second learner configured to perform the multilayer perceptron-based deep learning by inputting the points extracted from the second range sampler;
        a third range sampler configured to extract the points within the third preset distance from each center of the selected number of points; and
        a third learner configured to perform the multilayer perceptron-based deep learning by inputting the points extracted from the third range sampler.

2. The lane recognition device of claim 1, wherein the LiDAR is configured to provide point cloud type information to the pre-processor.

3. The lane recognition device of claim 2, wherein the pre-processor is configured to extract points which can be recognized as lanes and to provide the extracted points to the deep learning device, based on intensity information of each of points included in the point cloud type information.

4. The lane recognition device of claim 3, wherein the intensity information of each of the points is information having a lower value as a surface color of an object on which a point is detected is closer to black, and having a higher value as the surface color of the object on which the point is detected is closer to white.

5. The lane recognition device of claim 4, wherein the pre-processor is configured to extract only points in which a ratio of an intensity of a current point to an intensity of a previous point exceeds a preset range as points which can be recognized as the lanes, based on the intensity information of each of the points included in the point cloud type information.

6. The lane recognition device of claim 2, wherein the pre-processor includes:
an extractor configured to extract only points which can be recognized as lanes in the point cloud type information; and
a point input device configured to up-sample or down-sample a number of points provided from the extractor to generate the lane point candidate group having a predetermined number of points.

7. The lane recognition device of claim 1, wherein the pre-processor is configured:
to perform down-sampling to provide the lane point candidate group with a decreased number of points to the deep learning device, when a number of points included in the lane point candidate group is counted and is greater than or equal to a preset number, and
to perform up-sampling to provide the lane point candidate group with an increased number of points to the deep learning device, when the number of points included in the lane point candidate group is less than the preset number.

8. The lane recognition device of claim 7, wherein the pre-processor is configured to perform the down-sampling or the up-sampling to provide the lane point candidate group of a predetermined number of points to the deep learning device.

9. The lane recognition device of claim 1, wherein the deep learning device further includes:
a learning result integrator configured to integrate learning information provided from the first leaner, the second learner and the third learner; and
a decoder configured to decode a result of the learning result integrator to generate the lane recognition information.

10. The lane recognition device of claim 9, wherein the lane recognition information includes a probability that each point included in the lane point candidate group is a noise point, a probability that each point included in the lane point candidate group is a left lane point, and a probability that each point included in the lane point candidate group is a right lane point.

11. A lane recognition method based on a Light Detection and Ranging (LiDAR) for a vehicle, the lane recognition method comprising:
a receiving operation of receiving a lane point candidate group from the LiDAR;
an extraction operation of extracting points in which an intensity ratio of a current point to an intensity of a previous point exceeds a preset range based on intensity information of points included in the lane point candidate group;
a point input operation of sampling a number of points extracted in the extraction operation to a predetermined number;
a first range sampling operation of selecting a predetermined number of points among points sampled in the point input operation and extracting points within a first distance from each center of the selected number of points;
a second range sampling operation of extracting points within a second distance from each center of the selected number of points selected in the point input operation;
a third range sampling operation of extracting points within a third distance from each center of the selected number of points selected in the point input operation;
a first learning operation of learning the points extracted in the first range sampling operation;
a second learning operation of learning the points extracted in the second range sampling operation;
a third learning operation of learning the points extracted in the third range sampling operation;
a learning result integration operation of integrating results learned in the first learning operation, the second learning operation and the third learning operation;
a decoding operation of decoding the learning results integrated in the learning result integration operation; and
a post-processing operation of generating lane recognition information through a fitting algorithm based on results of the decoding operation.

12. A lane recognition method based on a Light Detection and Ranging (LiDAR) for a vehicle, the method comprising:
receiving, by a pre-processor, a lane point candidate group from the LiDAR;
extracting, by the pre-processor, points in which an intensity ratio of a current point to an intensity of a previous point exceeds a preset range based on intensity information of points included in the lane point candidate group;
sampling, by the pre-processor, a number of points extracted in the extracting to a predetermined number;
selecting, by the pre-processor, the predetermined number of points among the points sampled in the sampling and extracting points within a first distance from each center of the selected number of points;
performing, by the pre-processor, a first range sampling operation of selecting a predetermined number of points among points sampled in sampling and extracting points within a first distance from each center of the selected number of points;
performing, by the pre-processor, a second range sampling operation of extracting points within a second distance from each center of the selected number of points;
performing, by the pre-processor, a third range sampling operation of extracting points within a third distance from each center of the selected number of points;
learning, by a deep learning device, the points extracted in the first range sampling operation;
learning, by the deep learning device, the points extracted in the second range sampling operation;
learning, by the deep learning device, the points extracted in the third range sampling operation;
integrating, by the deep learning device, results learned in the first learning operation, the second learning operation and the third learning operation;

decoding, by the deep learning device, the learning results integrated in the learning result integration operation; and generating lane recognition information, by the deep learning device, by use of a fitting algorithm based on results of the decoding.

13. The lane recognition method of claim 12, wherein the pre-processor is configured:

to perform down-sampling to provide the lane point candidate group with a decreased number of points to the deep learning device, when a number of points included in the lane point candidate group is counted and is greater than or equal to a preset number, and to perform up-sampling to provide the lane point candidate group with an increased number of points to the deep learning device, when the number of points included in the lane point candidate group is less than the preset number.

14. The lane recognition method of claim 13, wherein the pre-processor is configured to perform the down-sampling or the up-sampling to provide the lane point candidate group of a predetermined number of points to the deep learning device.

15. The lane recognition method of claim 12, wherein the intensity information of each of the points is information having a lower value as a surface color of an object on which a point is detected is closer to black, and having a higher value as the surface color of the object on which the point is detected is closer to white.

16. The lane recognition method of claim 12, wherein a post-processor is configured to convert the lane recognition information into lane information by use of a lane curve fitting algorithm, and wherein the lane recognition information includes a probability that each point included in the lane point candidate group is a noise point, a probability that each point included in the lane point candidate group is a left lane point, and a probability that each point included in the lane point candidate group is a right lane point.

* * * * *